United States Patent Office 3,803,270
Patented Apr. 9, 1974

3,803,270
HALO-SUBSTITUTED BICYCLO α-HYDROXY-
ALKYL PHOSPHONIC ACID DIESTERS
Miltiadis Ioannu Iliopulos, 32 Willowbrook Acres,
Parkersburg, W. Va. 26101
No Drawing. Filed Aug. 4, 1971, Ser. No. 169,105
Int. Cl. C07f 9/40
U.S. Cl. 260—953       6 Claims

ABSTRACT OF THE DISCLOSURE

Halogen-substituted bicyclic α-hydroxyalkyl phosphonic acid diesters of the structural formula

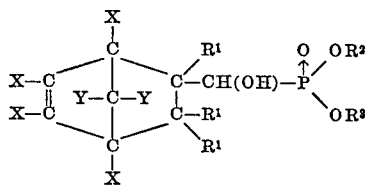

are prepared by reacting a halogen-substituted bicyclic aldehyde of the formula

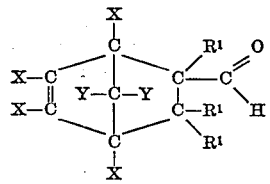

with a dialkyl hydrogen phosphite of the formula

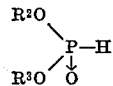

in the presence or absence of a base.

In the formulas given each X represents a middle halogen, e.g. bromine or chlorine, Y represents a hydrogen or halogen, e.g. chlorine or bromine and each $R^1$ represents independently a hydrogen atom or a lower alkyl group, e.g. $CH_3$, $C_2H_5$, n-$C_3H_7$, iso-$C_3H_7$ etc. $R^2$ and $R^3$ could be one of the combinations of the following: alkyl, alkenyl, cycloalkyl, aryl or arylalkyl. The radicals $R^2$ and $R^3$ may be substituted by halogens.

The new halogen-substituted bicyclic α-hydroxyalkyl phosphonic acid diesters produced are useful intermediates for the preparation of novel derivatives. They find utility as flame retardant additives for polymers and in formulations of additives for lubricating oils.

BACKGROUND OF THE INVENTION

Field of the invention

This invention relates to novel bicyclic α-hydroxyalkyl phosphonates. In particular, this invention is concerned with the preparation of novel α-hydroxyalkyl phosphonic acid diesters containing in their molecule a halogen-substituted norbornene ring. These compounds are useful as flame retardant additives for lubricating oils and for various polymers such as polyurethanes, polystyrenes, polyacrylates and polymethacrylates. They also are useful as intermediates for the preparation of novel derivatives.

Description of the prior art

Various members of this novel class of organophosphorus compounds including their infrared spectra were described for the first time in the professorial thesis (book) of the inventor entitled: "Beiträge zur Chemie Phosphororganischer Verbindungen," Habilitationsschrift, pp. X+368, chapter VI, pp. 129–141 and 261–266, University of Stuttgart, published end of August 1970 in the Federal Republic of Germany.

SUMMARY OF THE INVENTION

This invention relates to novel phosphorus and halogens containing monofunctional compounds. The novel compounds of this invention are represented by the following general structural formula (1)

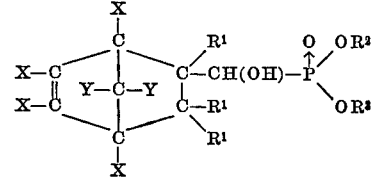

wherein each X represents a middle halogen, e.g. chlorine or bromine, Y represents a hydrogen atom or a halogen, e.g. chlorine or bromine and each of the $R^1$ radicals can be independently a hydrogen atom or a lower alkyl group, e.g. $CH_3$, $C_2H_5$, n-$C_3H_7$, iso-$C_3H_7$ etc. $R^2$ and $R^3$ are alkyl, e.g. $CH_3$, $C_2H_5$, n-$C_3H_7$, iso-$C_3H_7$, $C_5H_{11}$, $C_2H_4Cl$ etc., alkenyl e.g. $CH_2$=CH, $CH_2$=CH—$CH_2$, $CH_3$—CH=CH—$CH_2$ $(CH_3)_2C$=CH—$CH_2$ etc., cycloalkyl, e.g. $CyC_4H_7$, $CyC_5H_9$, $CyC_6H_{11}$ etc., arylalkyl, e.g. $C_6H_5CH_2$, $BrC_6H_4CH_2$, $C_6H_5C_2H_4$ etc. or aryl, e.g. $C_6H_5$, p-$CH_3C_6H_4$, o-$ClC_6H_4$ etc. $R^2$ and $R^3$ may contain substituents such as halogen, viz Cl, Br or F. The radicals $R^1$, $R^2$ and $R^3$ may be the same or different.

The novel halogen-substituted bicyclic α-hydroxyalkyl phosphonic acid diesters are readily prepared by reacting a halogen-substituted bicyclic aldehyde of the formula (2)

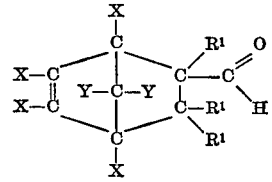

with a dialkyl or diaryl hydrogen phosphite of the Formula 3

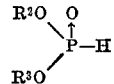

in the presence and/or absence of a base.

In the Formulas 2 and 3 X, Y, $R^1$, $R^2$ and $R^3$ are as defined in Formula 1 above.

Compounds of the general structural Formula 2 are known in the art and can be prepared by reaction of a halogen-substituted 1,3-cyclopentadiene and an α,β-unsaturated aldehyde in the Diels-Alder manner. (References: (1) S. B. Soloway, U.S. Pat. 2,759,011; (2) S. B. Soloway, U.S. Pat. 2,761,879; (3) S. B. Soloway, J. G. Morales and J. Van Overbeck, U.S. Pat. 2,758,918.) The reaction between the halo-substituted bicyclic carboxaldehyde and the dialkyl or diaryl hydrogen phosphite can be carried out at temperatures about −20 deg. C. and 120 deg. C., preferably from 10 deg. C. to 80 deg. C. Generally the reactants are present in equimolar amounts. Reaction times may vary but generally times in the range of one to seven hours are sufficient to complete the reaction.

The presence of a base catalyzes the reaction and reduces the reaction time considerably. In general, the amount of the base used can range between 0.1% to 10% by weight based on the reactants. The sodium salts of organic alcohols such as sodium methoxide, sodium ethoxide and the like in form of a saturated alcoholic solution and the tert. amines such as trimethylamine, triethylamine, pyridine, diethylaniline etc. may be utilized. The volatile amines are particularly preferred. It, generally, is preferred to carry out the reaction in the presence of an inert organic liquid which is a solvent for the reactants and/or the product in order to better regulate the temperature of the reaction. Examples of suitable organic solvents which can be employed as the reaction medium are aromatic hydrocarbons, e.g. benzene, toluene, xylene, ethylbenzene or chlorobenzene, chlorinated aliphatic hydrocarbons, e.g. chloroform, methylene chloride, 1,2-dichloroethane etc., alcohols and ethers. In cases in which the reaction is carried out without use of a solvent it is preferred to employ a 0.5 to 3.0 molar excess of the dialkyl or diaryl hydrogen phosphite, particular in such cases in which the reactants and the product are soluble in the phosphite.

If an unsaturated phosphite is reacted it is often desirable to incorporate a small amount of a stabilizer or antioxidant into the reaction mixture in order to avoid polymerization of the phosphite and the product. In the most cases of the reaction of a dialkyl or diaryl hydrogen phosphite with a halogen-substituted bicyclic carboxaldehyde of Formula 2 a high viscous discolored by-product the quantity of which does not exceed 5 weight percent of the obtained product under normal reaction conditions. These by-products contain about 2–5% phosphorus. They adhere to the crystals of the main products but usually can be removed by using adsorbents during the crystallization processes.

The following examples illustrate ways in which the principle of the invention has been applied, but are not to be construed as limiting its scope.

EXAMPLE 1

A solution of 16.44 grams (0.05 mole) of 1,4,5,6,7,7,-hexachlorobicyclo(2.2.1)-5-heptene - 2 - carboxaldehyde and 8.30 grams (0.05 mole) of di-isopropyl hydrogen phosphite in 100 ml. of thiophene free benzene was placed in a three necked flask equipped with a dropping funnel, a stirrer, a thermometer and a reflux condenser. While stirring 3.50 grams (0.035 mole) of freshly distilled triethylamine were added dropwise in such a rate that the temperature of the reaction mixture did not exceed the 30 deg. C. Upon completion of the addition the mildly exothermic reaction appeared to be over and the reaction mixture which became dark brown colored was gently refluxed for one-half hour. After removal of the solvent under reduced pressure a crystalline solid was obtained almost in a quantitative yield. The crude product was found to contain a small quantity of a high viscous black colored liquid. It was dissolved in a hot mixture of methanol-water (10:1 by volume) and the resulting solution treated with charcoal and then filtered. By adding to the hot filtrate water to the cloud point and cooling the colorless solution to about 5 deg. C., di-isopropyl 1,4,5,6,7,7-hexachlorobicyclo(2.2.1) - 5 - heptene - 2 - α - hydroxymethyl phosphonate of the formula

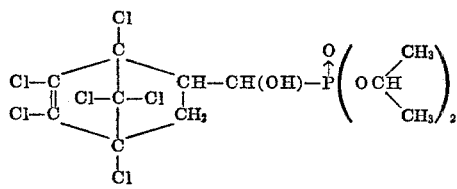

melting at 172.2 deg. C. was obtained. The yield of the pure compound was 16.10 grams (65%).

Analysis.—Calcd. for $C_{14}H_{19}Cl_6O_4P$ (percent): C, 33.97; H, 3.87; Cl, 42.98; P, 6.25. Found (percent): C, 33.67; H, 4.18; Cl, 43.23; P, 6.14 (flame photometry).

The infrared spectroscopical analysis confirmed the structure of the compound.

EXAMPLE 2

If in Example 1, diethyl hydrogen phosphite was employed in place of di-isopropyl phosphite, there was obtained upon completion of the steps therein described, diethyl 1,4,5,6,7,7-hexachlorobicyclo(2.2.1)-5-heptene-2-α-hydroxymethylphosphonate of the formula

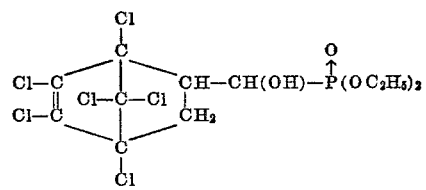

in a 48% yield melting at 171.5 deg. C.

Analysis.—Calcd. for $C_{12}H_{15}Cl_6O_4P$ (percent): C, 30.86; H, 3.24; Cl, 45.46; P, 6.63. Found (percent): C, 41.14; H, 3.43; Cl, 45.25; P, 6.65 (flame photometry).

EXAMPLE 3

In a glass apparatus similar to that described in Example 1 4.04 grams (0.04 mole) of triethylamine is added dropwise to a stirred mixture of 16.44 grams (0.05 mole) of 1,4,5,6,7,7-hexachlorobicyclo(2.2.1)-5-heptene-2-carboxaldehyde and 10.00 grams (0.1 mole) of dimethyl hydrogen phosphite. The excess of the dimethyl hydrogen phosphite is utilized as solvent. During the addition of the base the reaction mixture became dark brown.

Thereafter the reaction was heated at 60 deg. C. for about 20 minutes. After removal of the excess of dimethyl hydrogen phosphite and triethylamine under reduced pressure a crystalline solid was obtained. The latter contained approximately 2–3 weight percent of a black colored viscous liquid. The crude product was recrystallized several times from a methanol-water mixture in the presence of charcoal to yield 15.8 grams (72% yield) of dimethyl 1,4,5,6,7,7-hexachlorobicyclo(2.2.1)-5-heptene-2-α-hydroxymethylphosphonate of the formula

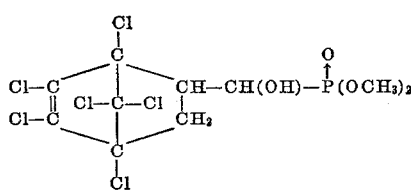

The colorless crystalline product melts at 178–178.5 deg. C.

Analysis.—Calcd. for $C_{10}H_{11}Cl_6O_4P$ (percent): C, 27.36; H, 2.52; Cl, 48.47; P, 7.06. Found (percent): C, 27.55; H, 2.71; Cl, 48.54; P, 7.27 (flame photometry).

EXAMPLE 4

A solution of equimolar amounts of dimethyl hydrogen phosphite and 1,4,5,6,7,7-hexachlorobicyclo(2.2.1)-5-heptene-2-carboxaldehyde in 150 ml. of thiophene free benzene was refluxed for four hours. After removal of the solvent under reduced pressure there was obtained an almost colorless solid. The crude product was treated with charcoal in a methanol-water mixture, and recrystallized to yield 1,4,5,6,7,7-hexachlorobicyclo(2.2.1)-5-heptene-2-α-hydroxymethyl phosphonic acid dimethyl ester melting at 175 deg. C.

Analysis.—Calcd. for $C_{10}H_{11}Cl_6O_4P$ (percent): Cl, 48.47; P, 7.06. Found (percent): Cl, 48.52; P, 7.16 (flame photometry).

Its infrared spectrum identical with the spectrum of the compound described in Example 3.

EXAMPLE 5

A charge of 16.44 grams (0.05 mole) of 1,4,5,6,7,7-hexachlorobicyclo(2.2.1)-5-heptene - 2 - carboxaldehyde, 8.10 grams (0.05 mole) of diallyl hydrogen phosphite and 120 ml. of thiophene free benzene was placed in the apparatus described in Example 1. The resulting solution was stabilized with one gram of p-hydroquinone and cooled to 10 deg. C. While stirring 3.5 grams (0.035 mole) of triethylamine were added dropwise. Upon completion of the addition of the base the black colored reaction mixture was refluxed for about 15 minutes. Thereafter the liquids were removed under reduced pressure. The obtained high viscous black colored liquid was allowed to stand in the freezer (−18° C.) for thirty days. The partly crystallized crude product was dissolved in methanol, treated several times with charcoal and recrystallized from a methanol-water mixture to give 9.55 grams (39% yield) of diallyl 1,4,5,6,7,7-hexachlorobicyclo(2.2.1) - 5-heptene-2-α-hydroxymethylphosphonate of the formula

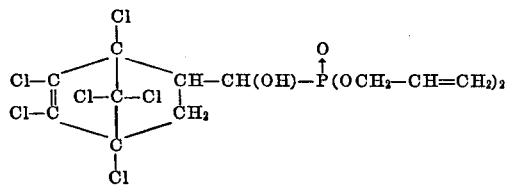

melting at 110 deg. C.

Analysis.—Calcd. for $C_{14}H_{15}Cl_6O_4P$ (percent): C, 34.24; H, 3.09; Cl, 43.33; P, 6.30. Found (percent): C, 34.26; H, 3.31; Cl, 43.22; P, 6.20 (flame photometry).

Infrared analysis confirmed the structure of the compound.

A series of additional experiments were carried out which are tabulated below in Table I. The examples in the table illustrate the variation of reactants. The products are characterized by phosphorus analysis.

consisting of bromine and chlorine, Y is hydrogen, chlorine or bromine, each of the $R^1$ radicals represents independently a hydrogen atom or a lower alkyl group of not over seven carbon atoms and $R^2$ and $R^3$ each is selected from the group consisting of lower alkyl, lower alkenyl, $C_4$–$C_6$ cycloalkyl, benzyl, phenylethyl, phenyl and chloro and bromo derivatives thereof.

2. A compound according to claim 1 of the formula

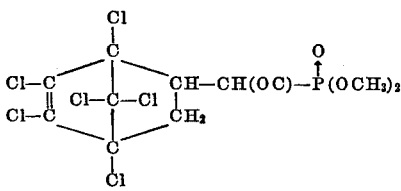

3. A compound according to claim 1 of the formula

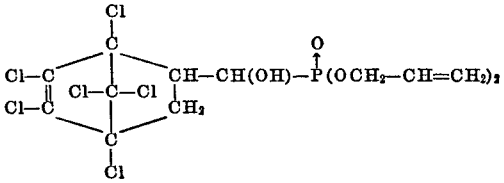

4. A compound according to claim 1, diethyl 1,4,5,6,7,7-hexachlorobicyclo(2.2.1) - 5-heptene-2-hydroxymethylphosphonate.

5. A compound according to claim 1, diisopropyl 1,4,5,6,7,7-hexachlorobicyclo(2.2.1) - 5 - heptene-2-hydroxymethylphosphonate.

6. A compound according to claim 1, dimethyl 1,4,5,6,7,7-hexabromobicyclo(2.2.1) - 5 - heptene - 2 - hydroxymethylphosphonate.

TABLE I

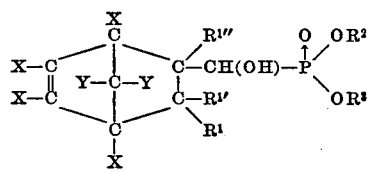

| Example number | X | Y | $R^1$ | $R^{1'}$ | $R^{1'''}$ | $R^2$ | $R^3$ | Base | Anal. P percent Calcd. | Found |
|---|---|---|---|---|---|---|---|---|---|---|
| 6 | Cl | Cl | H | H | H | $(C_2H_4Cl)_2$ | | Et₃N | 5.78 | 6.00 |
| 7 | Br | Br | H | H | H | CH₃ | CH₃ | Me₃N | 4.38 | 4.52 |
| 8 | Cl | Cl | H | H | CH₃ | CH₃ | CH₃ | Py | 6.83 | 6.98 |
| 9 | Cl | H | CH₃ | H | H | CyC₆H₁₁ | CyC₆H₁₁ | None | 5.95 | 5.73 |
| 10 | Cl | Cl | C₂H₅ | H | H | CH₃ | CH₃ | None | 6.63 | 6.45 |
| 11 | Cl | H | H | H | H | C₆H₅ | C₆H₅ | Py | 6.26 | 6.32 |

Explanations: Anal. P percent=analysis percent phosphorus; Calcd.=calculated; Et₃N=triethylamine; Me₃N=trimethylamine; Py=pyridine; Cy=cyclo-.

What is claimed is:

1. A compound having the general formula

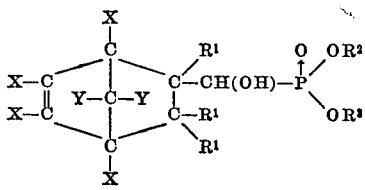

in which X represents a halogen selected from the group

References Cited

UNITED STATES PATENTS

| 2,934,555 | 4/1960 | O'Brien et al. | 260—970 X |
| 3,318,979 | 5/1967 | Sandri | 260—956 |
| 3,318,980 | 5/1967 | Sandri | 260—956 |
| 3,406,225 | 10/1968 | Raden | 260—953 |

LORRAINE A. WEINBERGER, Primary Examiner

R. L. RAYMOND, Assistant Examiner

U.S. Cl. X.R.

252—49.9; 260—45.9 B, 970